May 4, 1965 D. VOLKMANN 3,181,566
CONTROL VALVE FOR PNEUMATIC EQUIPMENT
Filed Aug. 28, 1961 5 Sheets-Sheet 1

INVENTOR
Dieter Volkmann
By
Richards & Geier
ATTORNEYS

May 4, 1965   D. VOLKMANN   3,181,566
CONTROL VALVE FOR PNEUMATIC EQUIPMENT
Filed Aug. 28, 1961   5 Sheets-Sheet 5

INVENTOR
Dieter Volkmann
BY
Richards y Geier
ATTORNEYS

United States Patent Office 3,181,566
Patented May 4, 1965

3,181,566
CONTROL VALVE FOR PNEUMATIC EQUIPMENT
Dieter Volkmann, Neustadt am Rubenberge, Germany, assignor to Bukama G.m.b.H., Hannover, Germany, a firm
Filed Aug. 28, 1961, Ser. No. 135,100
13 Claims. (Cl. 137—625.6)

This invention resides in the provision of an air-valve construction in which a manually operated valve admits compressed air to a second valve for the purpose of the operation of same. This second valve feeds compressed air to a pneumatic percussion device the piston of which acts upon a punch which drives fastener means, for instance staples or nails into a workpiece. For the compressed air to the percussion piston, with as little delay as possible, to its full pressure and to force said piston down in a sudden burst for the working stroke, it is necessary for the compressed-air supply valve to have a large cross-sectional area of aperture. It follows the valve is exposed to a large pressure charge which, consequently, must be overcome by the power of the labourer's fingers. As pneumatic staplers have to effect a large number of working stroke per time unit and as, for each of these strokes, the valve has to be operated manually, this entails a severe physical strain upon the labourer.

An important object of the invention is to reduce the finger pressure required to operate the control valve as well as the movement of the valve trigger required to supply compressed air to the stapler for driving the fastener means into the workpiece.

It is another important object of the invention to relieve the valve body by utilizing a differential piston exposed, on either side, to the action of the compressed air.

It is still another object of the invention to provide a valve arrangement for pneumatic staplers allowing of the opening of the air supply valve in a sudden blow with as little manual force as possible, thus resulting in a high performance of the stapler.

These and other objects of the invention will become apparent to those skilled in the art from a reading of the description in connection with the accompanying drawings, in which the invention, for purpose of illustration, is shown as applied to a portable pneumatic stapler.

Figure 1:
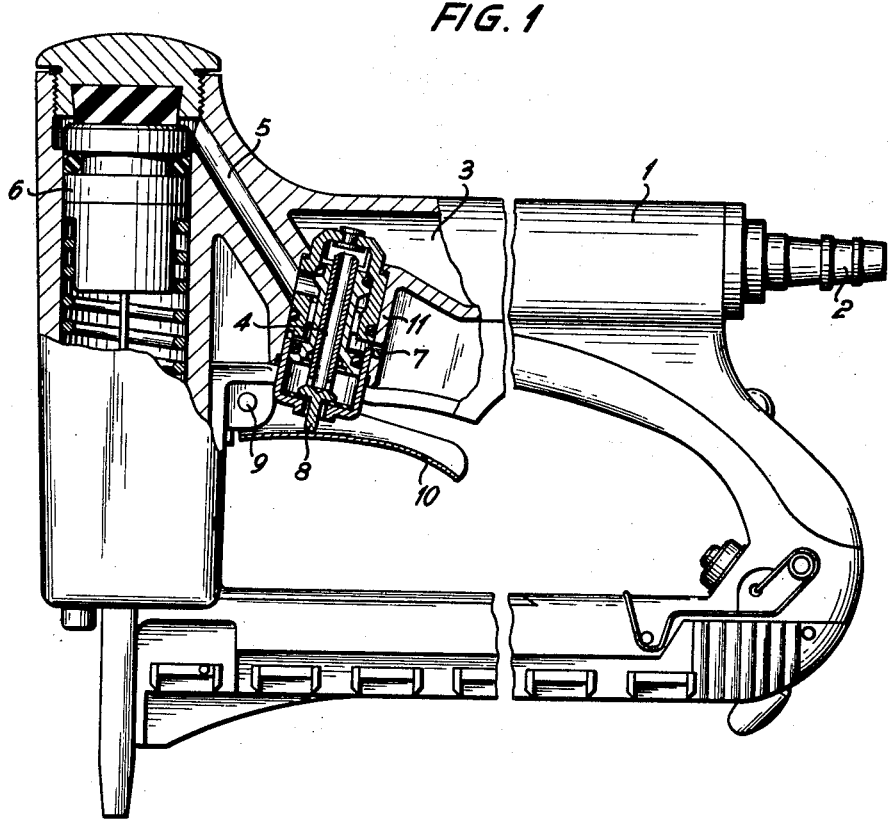
Figure 2:
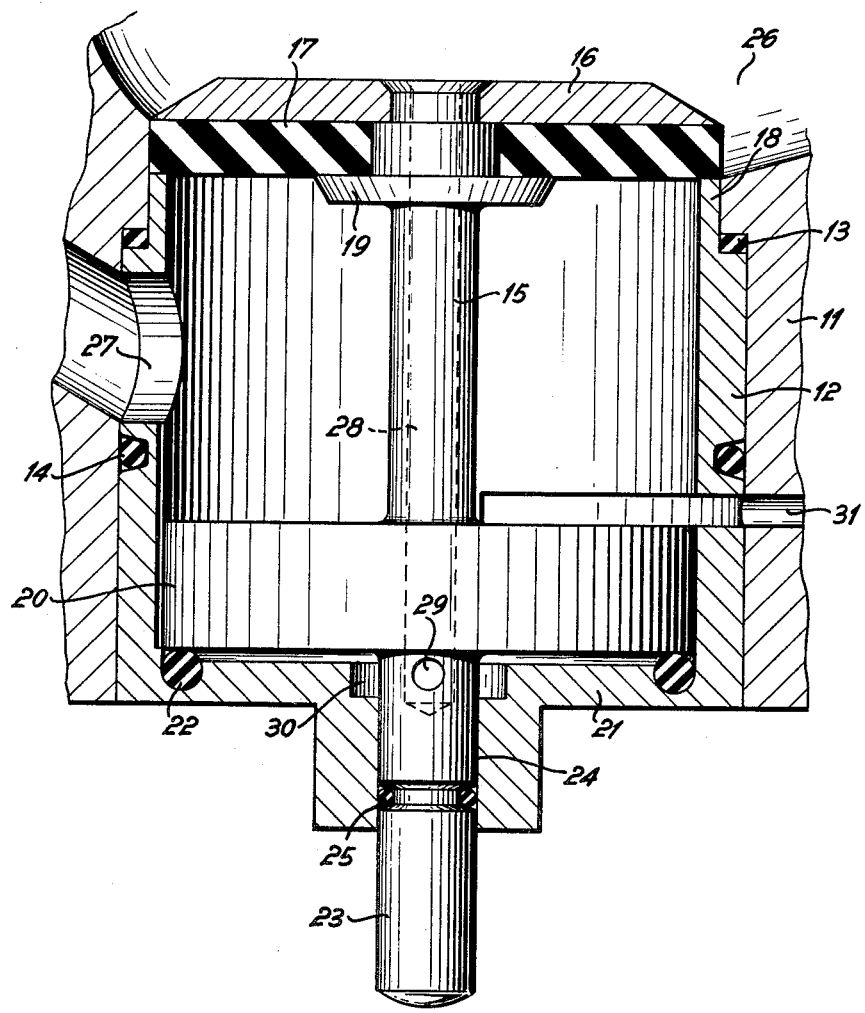
Figure 3:
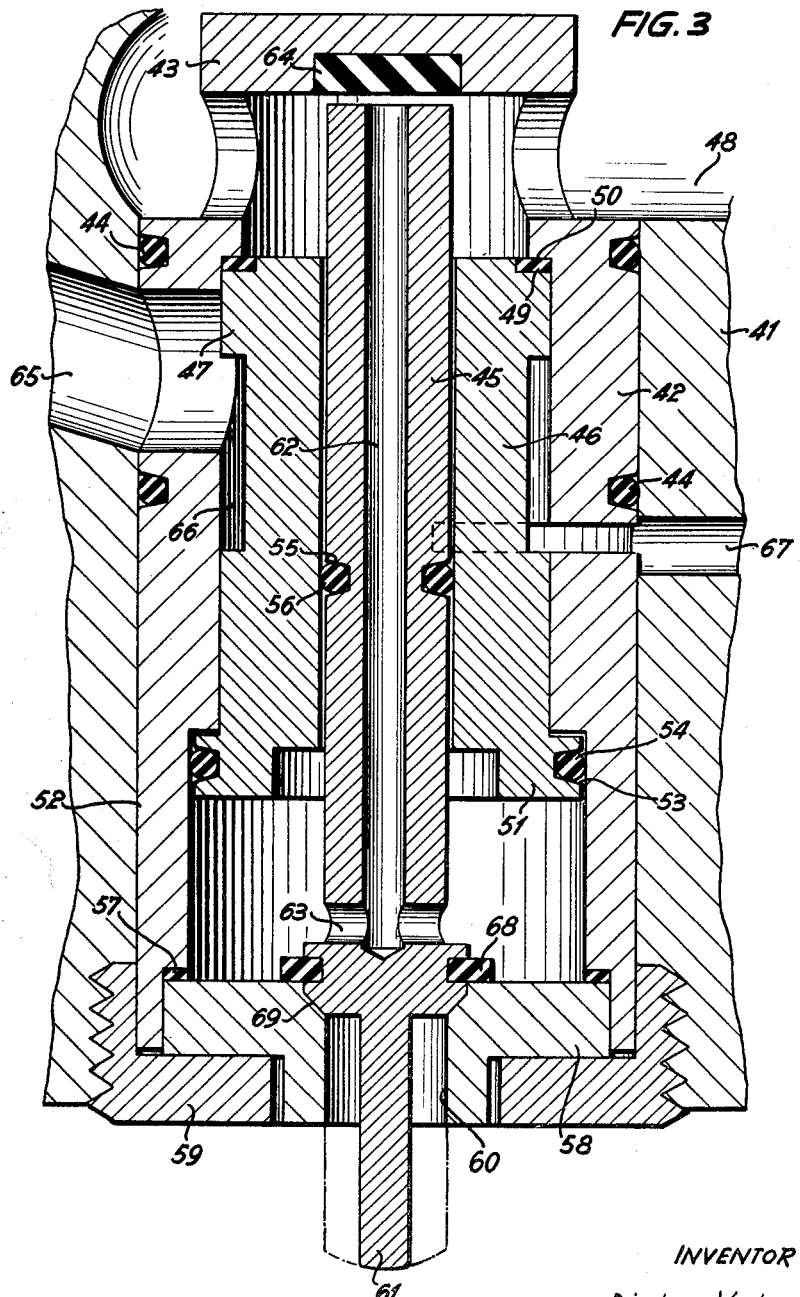
Figure 4:
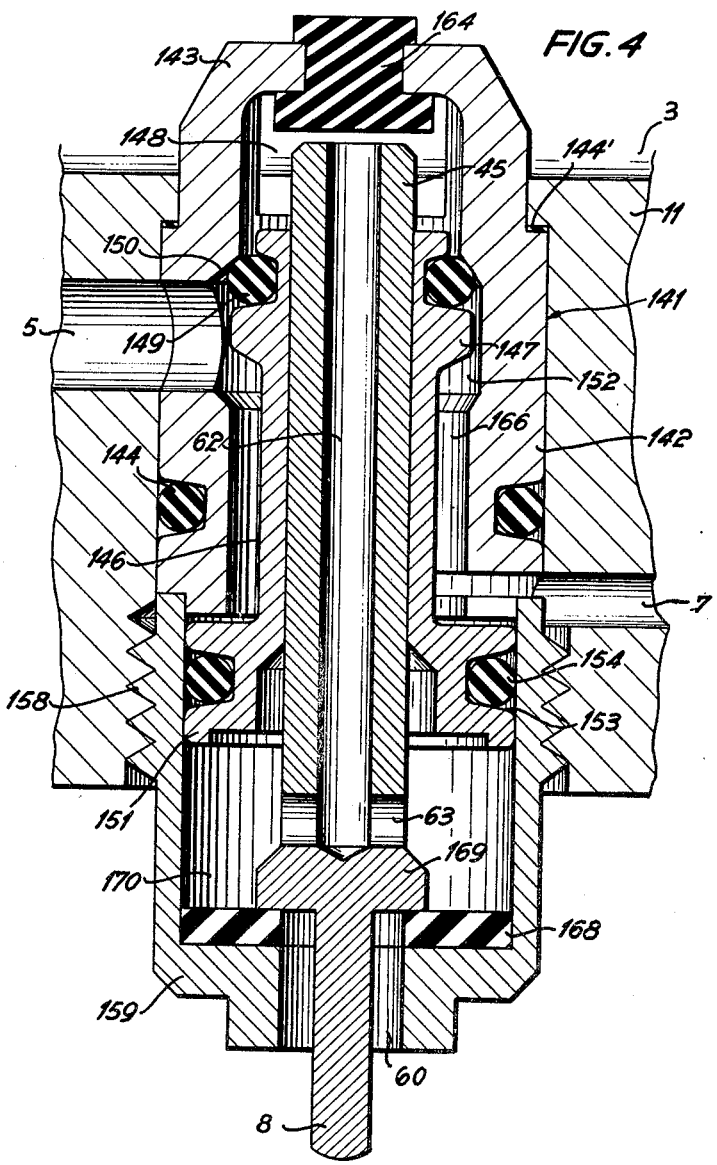
Figure 5:
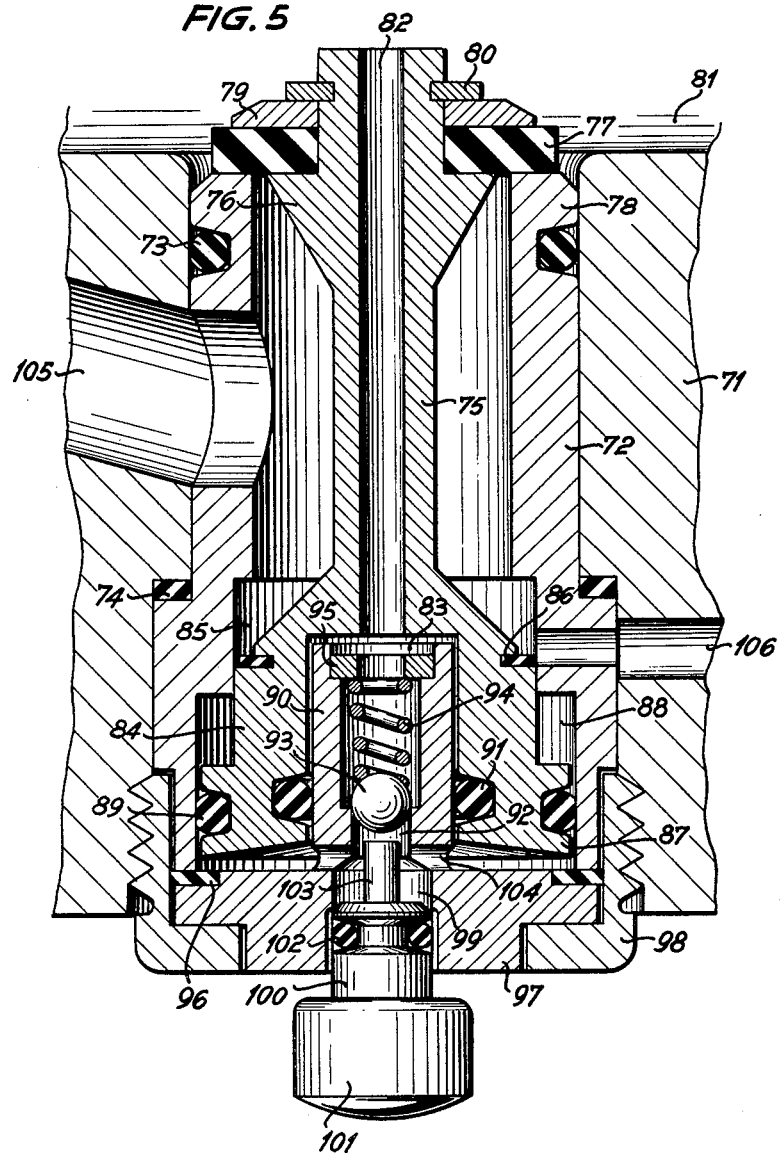

In the drawings:
FIG. 1 and FIG. 4 are a side elevation, with parts broken away and parts in section, of a portable stapler with the control valve structure embodying this invention,
FIG. 2 is a sectional view of a different control valve embodying this invention,
FIG. 3 is a sectional view of another modification of this invention,
FIG. 5 is a sectional view showing a further modification of this invention;
FIGURES 2 to 5 are shown in an enlarged scale.

Referring to FIGURE 1 of the drawings the pneumatic driven portable stapler for driving in staples or other fastening means consists of a housing body 1 including a handle section; said housing body 1 is provided with a conventional connection 2 to a suitable supply of air under pressure. The air flows into a large air chamber 3 which communicates, by means of a control valve 4, with a passage 5 leading to the main cylindrical part of the body 1. Slidably mounted within said cylindrical part is a piston 6 which, in a conventional manner, is guided to slide against the pressure of a spring. Firmly secured to said piston is a staple driver which drives the fastening means issuing from a magazine provided in the lower part of the housing body 1 into the workpiece. The movable body of control valve 4 is lodged in the valve housing 11 constituting a part of the housing body 1 and, at its bottom side, is provided with a stem 8 which, by means of a trigger 10 pivoted at 9 on the under side of the handle section, may be shifted upwards to open the valve. Furthermore, the valve housing 11 communicates with an exhaust passage 7 which is open when the communication between air chamber 3 and air passage 5 is interrupted, i.e. when the control valve 4 is closed.

In the form of the invention illustrated in FIGURE 2 the valve housing 11 is provided with a large orifice which is stepped at the upper side. This orifice receives a cylindrical sleeve 12. By means of packing rings 13, 14, said sleeve 12 is sealed against the valve housing 11. Slidably mounted within the sleeve 12 is a valve body 15 designed as a differential piston, the main piston 16 of which is lodged at the upper end and serves as a valve disc. Said valve disc is equipped with a sealing disc 17 made e.g. of rubber and secured to the underside of said valve disc. In the closed position represented in the drawings, said sealing disc 17 rests on the upper rim of the sleeve 12, said rim serving as a valve seat and is supported by a flange 19 of the valve body 15. The auxiliary piston 20 forms a single piece with the valve body 15 and is sealed against the bottom 21 of the sleeve 12 by means of a sealing ring 22 of circular cross-section. Underneath the auxiliary piston 20, the valve body 15 continues in a stem 23 guided in a hole 24 of the bottom 21 of the sleeve 12 and sealed against same by means of a packing ring 25. The stem 23 reaches beyond the bottom 21 and fits against the trigger lever 10 of FIG. 1 so that it may be shifted, for the purpose of opening the valve, by the pressure of the fingers exerted on said trigger 10. When the stem 23 is thus shifted the sealing disc 17 is lifted from the valve seat 18 whereby the air-supply passage 26 communicates with a passage 27 leading to the main cylindrical section of the stapler. Said passages 26 and 27 correspond to air chamber 3 and passage 5 of the embodiment of FIGURE 1.

The valve body 15 is provided with an axial bore 28, said axial bore 28 being in permanent open communication with the air supply passage 26. By means of radial bores 29, said axial bore 28 communicates with a recess 30 of the bottom part 21 so that the pressure of the air permanently acts upon the under side of the auxiliary piston 20. The outer diameter of said auxiliary piston 20 is smaller than the outer diameter of the main piston 16 forming the valve disc so that the pressure of the air in passage 26 permanently keeps the valve body in closed position.

When opening the control valve the only counterpressure to be overcome is the balance pressure resulting from the difference in diameter between the main piston 16 and the auxiliary piston 20.

In the closed position of the valve body shown in the drawing, passage 27 leading to the main cylindrical section of the device is sealed against the air supply passage 26 but stands in permanent and open communication with an exhaust passage 31 branching off from the sleeve 12, said exhaust passage 31 corresponds to passage 7 of FIGURE 1. As soon the the valve body 15 is shifted into open position the auxiliary piston 20 closes the exhaust passage 31 so that the compressed air will flow from passage 26 into passage 27 taking its way through the open valve. On account of the large cross-section of the valve seat 18, this flow will meet with but small resistance so that the air may enter the passage 27 with minimum delay and submit the main piston of the device to its full pressure thus causing said piston to start its working stroke with high speed and driving the fastening means into the workpiece.

In the case of the embodiment of the control valve structure illustrated in FIGURE 3, a cylindrical sleeve 42 is lodged within a non-stopped orifice of the valve housing 41 of the stapler. Said sleeve is provided with a cover part 43 and secured to the valve housing 41, against which housing the sleeve is sealed by means of two packing rings 44. Slidably mounted within the sleeve 42 is a cylindrical shaft 45. Said shaft 45 is enclosed, in slidable fashion, by a valve body 46, said valve body 46 being shaped to form a differential piston with an upper main piston 47. This main piston, with its upper face, closes an air supply passage 48 and is provided with a sealing liner 49 which, in the closed position fits against a shoulder 50 of sleeve 42, which shoulder forms, in this case, a valve seat. The lower part of valve body 46 forms a auxiliary piston 51 which has a larger diameter than the main piston 47 and serves as a sealing element. Said auxiliary piston is guided within the lower part of the sleeve 42, the diameter of said lower part being increased. A sealing ring 54 of circular cross-section is lodged in a circular groove 53 of the auxiliary piston 51 and seals the latter against the sleeve 52. The shaft 45 is provided with a circular groove 55 receiving a packing ring 56 so as to seal the valve body 46 against the shaft 45.

At its lower end, the sleeve 42 is closed, via a packing ring 57, by a bottom plate 58. Said bottom plate is secured within the valve housing 41 by means of a threaded ring 59 and is provided, in its axial centre, with a hole 60 within which is guided the lower part of the shaft 45. Said lower part is formed to constitute a releasing stem 61 of the trigger lever 10 of FIGURE 1. The shaft 45 is perforated by an axial duct 62 which, by means of radial bores 63, is in open communication with the sleeve 52. The upper end of said duct 62 reaches into the air supply passage 48. The distance between said upper end and the cover part 43 provided with a sealing liner 64 is only small, of the order of some 0.5 millimeter; such distance corresponds to the stroke of the movable stem 61 serving as a releasing member and being operated by the trigger lever 10.

The upper part of the sleeve 42 communicates with a passage 65 leading to the main cylindrical part of the stapler. In the closed position of the control valve represented in the drawing, said passage 65 communicates with an exhaust passage 67 via a circular space 66 between valve body 46 and sleeve 42, said space 66 being sealed against the air supply passage 48 by means of the sealing liner 49.

The lower end of the shaft 45 is sealed against the bottom plate 58 of the sleeve 52 by means of a sealing ring 68 and is provided with a conical surface 69 which, in the closed position of the control valve, fits against the hole 60 of the bottom plate 58 and seals same hole. In the closed position of the control valve represented in the drawing, the air supply passage 48 is, via the duct 62 of shaft 45 and its radial bores 63, in open communication with sleeve 52 so that the pressure of the air acts upon the under surface of the auxiliary piston 51. As the area of said piston is larger than the upper front surface of the main piston 47, valve body 46 is held in closed position by the difference in pressure, the part of the sleeve 52 underneath the auxiliary piston 51 being sealed against the open air by means of the sealing ring 68.

In order to open the control valve, the stem 61 is shifted upward until the upper end of shaft 45 fits against the sealing liner 64 of the cover part 43 thus closing the duct 62 against the air supply passage 48. At the same time, the sleeve 52 is in communication with the open air as the conical surface 69 and the sealing ring 68 are lifted from the bottom plate 58. Therefore the air in the sleeve 52 may escape through the hole 60, a process speeded up by flattening two opposite sides of the cylindrical releasing stem 61.

The compressed air acting upon the upper front surface of main piston 47 is now able to force down the valve body 46 and to force away the main piston 47 from the valve seat 50 so that the valve is immediately opened and the air from passage 48 may flow into the passage 65.

In the course of this operation, the valve body 46 is forced down until the auxiliary piston 51 fits against the bottom plate 58 thus closing, at the same time, the exhaust passage 67.

To open the control valve, the releasing stem 61 is only shifted over the distance between the shaft 45 and the cover part 43, and the only counterpressure to be overcome is the balance pressure resulting from the difference between the diameters of the main piston 47 and the auxiliary piston 51. It follows that, apart from the very small stroke necessary to operate the valve, the force required to move the releasing stem 61 is also very small. Apart from this, the opening move of the valve body is assisted by the flow of the air so that a quick opening of the valve in a sudden burst is provided.

The valve only remains open for as long as the releasing stem 61 is submitted, via the trigger lever 10, to the pressure of the fingers of the labourer. As soon as the trigger lever is released the force of gravity moves down the shaft 45, the gap between the upper end of the shaft and the sealing liner 64 of the coverpart 43 is opened and the compressed air from passage 48 flows through the ducts 62, 63 and, acting upon the auxiliary piston 51, returns the valve body 46 into closed position.

In special cases, the valve arrangement according to FIGURE 3 may be designed in a different way as, for instance, is shown in FIG. 4 representing the control valve 4 of FIG. 1 on an enlarged scale.

Referring now to FIG. 4, the valve housing 11 constituting part of the main body 1 of the stapler is provided with a cylindrical orifice 141 stepped at its upper end. Said orifice receives a sleeve 142 the upper end of which is shaped as a cap 143. Via a lateral clearance 148, said sleeve 142 is in open communication with the air supply passage 3. The sleeve 142 is sealed against the valve housing 11 by means of a packing ring 144 of circular cross-section and, against the shoulder of the hole 141, by means of a packing ring 144'. The cap 143 is provided with a cylindrical sealing liner 164 of elastic synthetic material inserted in a central hole of cap 143.

The sleeve 142 encloses the cylindrical shaft 45 which, essentially, is designed in the same manner as in the embodiment of FIG. 3 and, in this case, too, is perforated by the axial duct 62. Said axial duct 62 is at its lower end, via the radial holes 63, in open communication with a chamber 170 limited by a cup-shaped bottom part 159. By means of screw threads 158 this bottom part 159 is screwed into the orifice 141 and, with its upper edge, engages a recess of the sleeve 142 whereby the sleeve is firmly held in position. The shaft 45 continues, at its lower end, in the valve actuating stem 8 flattended at either side. Said stem is guided in the hole 60 of bottom part 159.

In the closed position represented in the drawing, the exhaust ducts formed by the flattened sides of the stem 8 and the wall of the hole 60 are sealed by a disc 168 of yielding material against which abuts a part 169 of shaft 45, the diameter of said part 169 being increased.

Slidably mounted upon the shaft 45 is a valve member 146 designed in the same manner as the valve member 46 of FIG. 3, as a differential piston with a main piston 147 and a auxiliary piston 151. On the upper part of main piston 147 a sealing ring 149 of circular cross-section is lodged in a corresponding circular groove of the main piston 147. Said sealing ring 149 abuts a conical surface 150 provided in the sleeve 142 and thus exercises its sealing effect. Said conical surface 150 borders a cylindrical recess 152 provided in the valve sleeve 142. The air duct 5, leading to the main cylindrical portion of the stapler, is branched off from said recess. The cylindrical recess 152 has a larger diameter than the main piston 147 and continues downwards in a cylindrical part 166 of the same diameter as the main piston 147. The exhaust passage 7 branches off from the lower end of said cylindrical surface 166.

The diameter of the auxiliary piston 151 is larger than that of the main piston 147. Said auxiliary piston 151 is slidably guided within the cylindrical inner surface of the cup-shaped bottom part 159 and is sealed against same by a packing ring 154 of circular cross-section provided in a circular groove 153.

In the position of parts illustrated in FIGURE 4, the upper end of shaft 45 has a small distance from the sealing liner 164 of cap 143 so that air issuing from the supply passage 3 may travel through the lateral recess 148 into the duct 62 of shaft 45 and into the radial ducts 63 thus entering the chamber 170 and acting upon the bottom surface of the auxiliary piston 151. As the annular surface of the auxiliary piston 151 has a larger cross-section than the main piston 147, the difference in pressure resulting from this arrangement will move upwardly the valve member 146. This causes the sealing ring 149 to abut the conical surface 150 and to exercise, in this way, its sealing effect. The passage 5 leading to the main cylindrical part of the stapler is thus blocked against the air supply passage 3 and is, via the annular space between the valve member 146 and the inner wall of the cylindrical part 166, in open communication with the exhaust passage 7. The chamber 170, on the other hand, filled with compressed air, is blocked against the open air by the shoulder 169 of shaft 45 pressing down the sealing disc 168.

When the valve actuating stem 8 is moved upwardly by squeezing the trigger lever the upper end of shaft 45 abuts the sealing liner 164 of cap 143 and thus closes the axial duct 62. In this position of the parts air travels from the chamber 170 through the exhaust ducts formed between the flat sides of the stem 8 and the wall of the hole 60 as the shoulder 169 of shaft 45 is lifted from the sealing disc 168. The compressed air issuing from the supply passage 3 reaches, through the lateral recess 148, the upper surface of the main piston 147 and presses downwards the valve body 146 as no counter-pressure is acting upon the auxiliary piston 151. This causes the sealing ring 149 to be lifted from the conical surface 150 so that, via the passage 5, air may immediately reach the main piston of the stapler whereupon the stapler is activated and strikes a sudden blow. As, in the course of its downward movement, the main piston 147 slides down on the wall of the cylindrical part 166 and as its sealing ring 149 exercises its sealing effect, this will cause the exhaust duct 7 to be effectively sealed against the passage 5.

As soon as the pressure of the fingers of the operator cease to keep the actauting stem 8 in upward position, shaft 45 descends on accunt of the force of gravity. As soon as the upper end of said shaft is no longer in contact with the sealing liner 164, air issuing from the supply passage 3 travels, through the axial duct 62 and the ducts 63, into the chamber 170 where the bottom surface of the auxiliary piston 151 is again submitted to the air pressure so that the valve member 146 is returned to closed position.

In this case, too, the small movement of the releasing stem 8 corresponding to the distance between shaft 45 and the sealing liner 164 will suffice to open the valve, the force required for the purpose being equally small as the complete opening of the valve is assisted by the flow of the compressed air.

By unscrewing the cup-shaped bottom part 159, valve sleeve 142 and valve member 146 may be removed in a very simple manner so that e.g. replacement of the sealing rings 149, 154 which, in the course of the operation of the device, are exposed to severe strain, will only take very little time as, for this purpose, it will do to remove the shaft 45 with the valve member 146 from the valve sleeve 142 while said sleeve 142 may be allowed to stay in the orifice 141 of valve housing 11. It is, however, equally simple to remove the whole valve sleeve 142 in order to replace the other sealing elements or other parts of the valve assembly which may have worn out or become unserviceable.

Referring to FIGURE 5 the valve assembly comprises a valve sleeve 72 lodged in an orifice of the valve housing 71 and sealed against same by means of packing rings 73, 74. Enclosed by the sleeve 72 is a movable valve member 75 which, at its upper cone-shaped part 76, carries a valve disc 77 of synthetic sealing material. Said disc 77 is seating, in the position of parts represented in FIGURE 5, on the upper end of the sleeve 72, said end being shaped to form a valve seat. By means of a metal disc 79 and a spring ring 80 said valve disc 77 is firmly secured to the valve member 75. An air supply passage 81, corresponding to the passage 3 of FIGURE 1, is in permanent open communication with an axial duct 82 of the valve member 75 which duct leads to a chamber 83. Said chamber is enclosed by the lower hollow part 84 of the valve member 75. This part forms a piston and is guided in a cylindrical part 85 of the valve sleeve 72, which part has a larger diameter than the upper part of the valve sleeve. The piston-shaped part 84 of valve member 75 carries a packing ring 86. In downward direction, the piston part 84 continues in an auxiliary piston 87 of a larger diameter, which auxiliary piston 87 is guided within the lower part 88 of the valve sleeve 72. This lower part 88 has a still larger diameter than the above mentioned part 85 of said sleeve. The auxiliary piston 87 is sealed against said lower part 88 by means of a sealing ring 89.

The chamber 83 formed by the piston 84 contains a jacket 90 against which the inner side of piston 84 is sealed by means of a packing ring 91 lodged in a circular groove of said piston. The bottom of the jacket 90 is perforated by an axial bore 92 forming a valve seat for a ball 93. Said ball is submitted to the pressure of a helical spring 94 supported by a ring 95, which ring is secured to the jacket 90.

Via a sealing ring 96, the valve sleeve 72 is closed by a bottom plate 97 held by a threaded ring 98 screwed to the valve housing 71. The bottom plate 97 is provided with a central hole 99 in which is guided a bolt 100 of a valve actuating member 101, said actuating member 101 being shiftable either directly or by means of the trigger lever 10 (FIGURE 1), by finger pressure. The bolt 100 is sealed against the hole 99 by means of a sealing ring 102 and continues in the shape of a pin 103 which abuts the valve ball 93 when the actuating member 101 is moved upwardly. The movement of said ball is in opposition to the spring 94. The jacket 90 and the bottom plate 97 are made in one piece. Between the jacket 90 and the bottom plate 97 radial bores 104 are arranged which bores are in communication with the axial duct 82 of the valve member 75.

There is an air passage 105 leading to the main piston of the stapler and an exhaust passage 106. Both passages are branched off from the valve sleeve 72.

In the position of parts illustrated in FIGURE 5, the air supply passage 81 is blocked since the valve disc 77 is seated on its seat 78 whereas the passage 105 is in open communication with the exhaust passage 106. Air in the passage 81 travels through the axial duct 82 of the valve member 75 to the chamber 83. As the valve ball 93 is not only pressed upon its seat by the spring 94 but also by the pressure of air, said ball 93 will effectively block the bore 92 thus preventing any air pressure from acting upon the bottom surface of the auxiliary piston 87.

In order to activate the stapler, the trigger level 10 (FIGURE 1) is squeezed. This serves the pin 103 to lift the valve ball 93 from its seat, whereupon air from the chamber 83 flows to the bottom surface of the auxiliary piston 87 through the open bore 92 and the radial bores 104. As said auxiliary piston 87 has a larger diameter than the valve disc 77 which is permanently submitted to the pressure of the air, the valve member 75 is moved upwardly. This movement causes the valve disc 77 to be lifted from its seat 78 and the duct 105 to be connected with the duct 81. Air may now activate the main piston of the stapler, a procedure which, on account of the large diameter of the valve sleeve 72, meets with but little resistance to the flow of the air. At the same time upward movement of the piston 84 blocks the exhaust passage 106 by the disc 86 arranged around the upper edge of the piston.

As soon as the trigger lever is released the valve ball 93 is pressed down on its seat by the spring 94 as well as by the compressed air in the chamber 83. This ball 93 thus closes the hole 92 and blocks the supply of air to the auxiliary piston 87. Now the air in the passage 81 presses the valve disc 77 on its seat thus causing the valve member 75 to return to closed position in which the passage 105 is blocked against the duct 81 and connected with the exhaust passage 106.

To open the valve, only a very slight movement of the trigger level and a small force of the operator's finger is required. The valve is opened with a sudden burst and with a large cross-sectional area of its aperture.

As the auxiliary valve formed by the hole 92 and the ball 93 are arranged co-axially with the main valve formed by the valve disc 77 and its seat 78 and as all parts of the valve assembly are enclosed by the valve sleeve 72 lodged in an orifice of the valve housing, the removal of this valve structure is as easy as in the other embodiments. In order to remove the valve, it is only necessary to unscrew the threaded ring 98 which will allow of the withdrawal in downward direction, either of the entire valve assembly with the valve sleeve 72 or of only the valve member 75. It will be apparent to those skilled in the art that the sealing elements 77, 89 and 91 exposed to the largest strain may be easily and quickly replaced without any prolonged interruption of operations whenever such a replacement is necessary.

The present invention is of considerable advantage for pneumatic equipment of all kinds, and in particular for portable pneumatic percussion devices presupposing a rapid series of working strokes and, on account of the small actuating manual force required, allows of a considerable increase of the performance of such devices. This is of particular importance where the percussion device is concerned for driving in staples, nails and other fasteners, so widely used in mass production.

As various possible embodiments may be made of the above invention, and as various changes may be made in the forms of construction set forth, it is understood that all matter herein set forth in order shown in the accompanying drawings is to be interpreted as illustrative and not in a limiting sense.

I claim:

1. A control valve for pneumatic equipment, comprising a sleeve member having an air supply passage, an air transmitting passage and an exhaust passage, said sleeve member comprising means forming a bottom surface thereof, a valve piston member, a valve rod member extending axially within said sleeve member, an auxiliary piston member located within said sleeve member, said auxiliary piston member being coaxial with said valve piston member and being spaced from said bottom surface, said valve rod member being coaxial with said piston members and having an uninterrupted axial bore connecting said air supply passage with the space between the surface of the auxiliary piston member located away from the valve piston member and said bottom surface, and an actuating member extending from said valve rod member partly outside of said sleeve member and adapted to actuate said valve rod member.

2. A control valve for pneumatic equipment, comprising a sleeve member having an air supply passage, an air transmitting passage and an exhaust passage, and comprising means forming a bottom surface thereof, a valve rod member extending axially within said sleeve member, a manual actuating member integral with said valve rod member and extending outside of said sleeve member, a valve piston member firmly connected with said valve rod member and open to said air transmitting passage, and an auxiliary piston member located within said sleeve member and firmly connected with said valve rod member, said auxiliary piston member being spaced from said valve piston member and from said bottom surface, said valve rod member having an axial bore connecting said air supply passage with the space between the surface of the auxiliary piston member located away from the valve piston member and said bottom surface, the diameter of said valve piston member being greater than the diameter of said auxiliary piston member.

3. A control valve for pneumatic equipment, comprising a sleeve member having an air supply passage, an air transmitting passage and an exhaust passage and having means forming a bottom surface thereof, a valve rod member extending axially within said sleeve member, an actuating member integral with said valve rod member and extending outside of said sleeve member, and a differential piston element located within said sleeve member and movable relatively to said valve rod member, said differential piston element comprising a valve piston member having a front surface and an integral auxiliary piston member having an opposed front surface spaced from said bottom surface, said valve rod member having an uninterrupted axial bore connecting said air supply passage with the space between said opposed front surface of the auxiliary piston member and said bottom surface, said front surface of the valve piston member being smaller than said opposed front surface of the auxiliary piston member.

4. A control valve for pneumatic equipment, comprising a sleeve member having an upper air supply passage, an air transmitting passage and an exhaust passage, and comprising means forming a bottom surface thereof, a valve rod member movable axially within said sleeve member from a closing position to an open position and vice versa and having an upper end and a lower end, an actuating member connected with the lower end of said valve rod member and extending through said bottom surface and outside of said sleeve member, a differential piston element located within said sleeve member and movable relative to said valve rod member, said differential piston element comprising a valve piston member having a front surface and an integral auxiliary piston member having an opposed front surface spaced from said bottom surface, the upper end of said valve rod member projecting above said valve piston member, said valve rod member having an uninterrupted axial bore connecting said upper end of the valve rod member and said air supply passage with the space between said opposed front surface of the auxiliary piston member and said bottom surface when said valve rod member is in a closing position, and means closing said axial bore when said valve rod member is moved to an open position.

5. A control valve in accordance with claim 4, wherein the distance between the last-mentioned means and said upper end of the valve rod member corresponds to the stroke of said actuating member.

6. A control valve in accordance with claim 4, wherein said lower end of the valve rod member is conical in in shape and fits into a similarly shaped hole formed in said bottom surface, said bottom surface having an exhaust passage enclosing said actuating member and communicating with said hole.

7. A control valve for pneumatic equipment, comprising a sleeve member having an air supply passage, an air transmitting passage and an exhaust passage, and comprising means forming a bottom surface thereof, a valve rod member extending axially within said sleeve member, a valve piston member integral with said valve rod member and having an operative front surface, an auxiliary piston member integral with said valve rod member and having an opposed front surface spaced from said bottom surface, said valve rod member being located between said piston members, an auxiliary valve located within said auxiliary piston member adjacent said opposed front surface, said valve rod member and said piston members having an axial bore adapted to be closed by said auxiliary valve and to connect said air supply passage with the space between said opposed front surface of the auxiliary piston member and said bottom surface, and an actuating member extending from said valve rod member partly outside of said sleeve member and adapted to actuate said auxiliary valve, the diameter of said auxiliary piston member being greater than the diameter of said valve piston member.

8. A control valve in accordance with claim 7, wherein said auxiliary valve, said valve rod member and said actuating member having a common central axis.

9. A control valve in accordance with claim 7, further comprising a jacket enclosing said auxiliary valve and enclosed by said auxiliary piston member, said jacket having bores communicating with said space.

10. A control valve for pneumatic equipment, comprising a sleeve having an upper cap-shaped portion communicating with an air supply passage and having a central opening, and a cylindrical portion having an inner recess, and an air transmitting passage communicating with said recess, a sealing liner mounted in said opening, a cylindrical shaft located within said sleeve and having an axial duct and radial holes communicating with said duct, a cup-shaped bottom part firmly engaging the bottom of said sleeve, said radial holes communicating with the interior of said bottom part, a valve actuating stem firmly connected with said shaft and constituting a continuation thereof, said stem extending with play through an opening formed in said bottom part, a sealing disc located within said bottom part and enclosing the last-mentioned opening, said shaft having an enlarged portion located adjacent said stem and adapted to engage said sealing disc, a valve member slidably mounted upon said shaft and comprising an upper main piston portion and a lower auxiliary piston portion having a larger diameter than said main piston portion, a resilient sealing ring carried by said main piston portion, said sleeve having an inner conical surface adapted to be engaged by said sealing ring, the recess of said sleeve having a larger diameter than that of said main piston portion, the cylindrical portion of said sleeve further having an air exhaust passage and a portion extending between said exhaust passage and said recess and having the same inner diameter as the outer diameter of said main piston portion, and another packing ring carried by said auxiliary piston portion and engaging said bottom part.

11. A control valve for pneumatic equipment, comprising a sleeve having a cylindrical portion, an open top and a closed bottom having an inner recess and a central hole communicating with said recess, a valve body constituting a differential piston and having a main piston located above said sleeve and constituting a valve disc, a sealing disc carried by said main piston and adapted to engage the top of said sleeve, a stem firmly connected with said main piston, a portion of said stem having an axial bore and a radial bore communicating with said axial bore and said inner recess, said stem having another portion extending through and beyond said central hole of the bottom of the sleeve, and an auxiliary piston firmly connected with said stem and having a larger diameter than that of said main piston, a sealing ring carried by the bottom of said sleeve and adapted to engage said auxiliary piston, said sleeve further having an air transmitting passage located between the main and auxiliary pistons and an air exhaust passage adapted to be closed by said auxiliary piston.

12. A control valve for pneumatic equipment, comprising a sleeve having an air transmitting passage and an air exhaust passage, a cover located above said sleeve, an air supply passage being located between said cover and said sleeve, a shaft located within said sleeve, a valve body slidably enclosing said shaft and constituting a differential piston having a main piston, an auxiliary piston of larger diameter than said main piston, and a recessed portion between the two pistons which is adapted to communicate with said air transmitting and air exhaust passages, said sleeve having a portion of smaller inner diameter enclosing said main piston and a portion of larger inner diameter enclosing said auxiliary piston, a sealing liner carried by said main piston, said sleeve having an inner shoulder adapted to be engaged by said liner to close said air supply passage, a packing ring carried by said shaft and engaging said valve body, and a plate closing the bottom of said sleeve and having a central hole, said shaft having a lower portion extending through said hole, and having surfaces adapted to engage the edges of said hole, the portion of the shaft above said lower portion having an axial duct and radial bores communicating with said duct and the interior of said sleeve between said auxiliary piston and said plate, the upper end of said axial duct being adapted to communicate with said air supply passage.

13. A control valve for pneumatic equipment, comprising a sleeve, a valve member movable within said sleeve and comprising an upper cone-shaped portion, an intermediate stem portion and a lower portion including a main piston and an integral auxiliary piston situated below said main piston and having a larger diameter than that of said main piston, a sealing disc carried by said cone-shaped portion and adapted to engage the upper edge of said sleeve, whereby said upper edge constitutes a valve seat, said valve member having an axial duct constituting an air supply passage, said sleeve comprising an inner portion guiding said main piston and another inner portion of larger inner diameter guiding said auxiliary piston, said sleeve further having an air transmitting passage communicating with the stem portion of said valve member and an air exhaust passage located in the first-mentioned inner portion of said sleeve, said main and auxiliary pistons enclosing an inner chamber, communicating with said duct, a hollow jacket located in said chamber and having a bottom having an axial bore, a ball, a spring located in said jacket and pressing said ball against said bore of the jacket, a bottom plate closing said sleeve and having a central hole, and a valve-actuating member extending into said hole and comprising a pin-shaped end adapted to engage and move said ball in a direction opposite to that of the pressure of said spring.

References Cited by the Examiner

UNITED STATES PATENTS

| | | | |
|---|---|---|---|
| 866,981 | 9/07 | Templin | 121—35 |
| 886,257 | 3/08 | Sergeant | 121—35 |
| 1,119,640 | 12/14 | Roettger | 91—51 XR |
| 1,125,825 | 1/15 | Englesson | 137—625.63 |
| 1,587,368 | 6/26 | Delvin | 121—35 |
| 2,771,907 | 11/56 | Joy | 137—625.63 XR |
| 2,899,935 | 8/59 | Dalton | 121—21 |
| 2,912,007 | 11/59 | Johnson | 137—625.64 XR |
| 2,915,754 | 12/59 | Wandel | 121—21 |
| 2,954,009 | 9/60 | Juilps | 121—21 |
| 2,960,067 | 11/60 | Osborne | 121—13 |
| 2,995,114 | 8/61 | Starr | 121—21 |
| 3,106,939 | 10/63 | Flick | 137—625.69 |

References Cited by the Applicant

UNITED STATES PATENTS 2,964,057  12/60  Dyson.

M. CARY NELSON, *Primary Examiner.*

KARL J. ALBRECHT, MILTON KAUFMAN,
*Examiners.*